United States Patent [19]

Lardellier

[11] Patent Number: 4,993,638
[45] Date of Patent: Feb. 19, 1991

[54] THRUST VECTORING NOZZLE ASSEMBLY

[75] Inventor: Alain M. J. Lardellier, Melun, France

[73] Assignee: Societe Nationale d'Etude et de Construction de Mateurs d'Aviation "S.N.E.C.M.A.", Paris, France

[21] Appl. No.: 486,851

[22] Filed: Mar. 1, 1990

[30] Foreign Application Priority Data

Mar. 1, 1989 [FR] France .................. 89 02640

[51] Int. Cl.$^5$ .................. F02K 1/52; F02K 1/46; F02K 1/78
[52] U.S. Cl. .................. 239/265.35; 239/265.19; 239/265.39; 60/230
[58] Field of Search .................. 239/265.19, 265.33, 239/265.35, 265.37, 265.39; 60/228, 230, 232; 244/51, 52

[56] References Cited

U.S. PATENT DOCUMENTS

| 3,130,544 | 4/1964 | Penza | 239/265.19 |
| 3,912,202 | 10/1975 | Jenkins | 244/52 |
| 4,363,445 | 12/1982 | Bouiller et al. | 239/265.35 |
| 4,508,270 | 4/1985 | Joubert | 239/265.35 |
| 4,778,109 | 10/1988 | Jourdain et al. | 239/265.27 |
| 4,809,932 | 3/1989 | Muller | 244/52 |

FOREIGN PATENT DOCUMENTS

| 1153561 | 3/1958 | France . | |
| 68790 | 6/1958 | France | 60/230 |
| 1303806 | 8/1962 | France . | |
| 2006901 | 1/1970 | France . | |
| 60-237147 | 11/1985 | Japan . | |
| 1139958 | 1/1969 | United Kingdom . | |

Primary Examiner—Andres Kashnikow
Assistant Examiner—Karen B. Merritt
Attorney, Agent, or Firm—Bacon & Thomas

[57] ABSTRACT

An exhaust nozzle assembly for vectoring the thrust of the exhaust gases from a turbojet engine is disclosed wherein the exhaust gases are vectored by an assembly that is separate from the flaps that are utilized to adjust the cross-sectional area of the exhaust nozzle. The thrust vectoring exhaust nozzle assembly has a moveable thrust vectoring assembly comprised of inner and outer vectoring members, each of which have a generally annular configuration. The vectoring members are pivotally attached to the exhaust nozzle so as to pivot about an axis extending generally perpendicularly to the longitudinal axis of the exhaust duct.

10 Claims, 4 Drawing Sheets

THRUST VECTORING NOZZLE ASSEMBLY

BACKGROUND OF THE INVENTION

The present invention relates to a nozzle assembly for an exhaust duct of a turbojet engine, more particularly such a nozzle assembly that is capable of diverting or vectoring the thrust from the turbojet engine.

It is known in the art to provide turbojet engines with exhaust nozzles having variable cross-sections in order to optimize the exhaust gas flow and pressure throughout the operational range of the aircraft. It is further known to provide such nozzles with a steering or vectoring capability in order to increase the maneuverability of the aircraft.

U.S. Pat. No. 4,778,109 to Jordain et al. discloses a two-dimensional exhaust nozzle arrangement having a converging-diverging configuration of variable cross-section in which the nozzle flaps also may deflect the exhaust gas stream at an angle to the longitudinal axis of the engine.

It is further known to provide generally annular exhaust nozzles with a moveable nozzle portion in order to deflect or vector the exhaust gases at an angle to the longitudinal axis of the engine. Such devices are shown in U.S. Pat. Nos. 4,363,445 to Bouiller et al. and 4,508,270 to Joubert.

While such known systems have proven reasonably successful, they are also complex, which results in the undesired increase in weight and bulk of the engine and, consequently, the aircraft. The increase in complexity is caused by the requirement of the prior art systems to not only pivot the annular array of flaps to vary the cross-section of the nozzle, but to also pivot the entire nozzle assembly to vector the exhaust thrust.

SUMMARY OF THE INVENTION

An exhaust nozzle assembly for vectoring the thrust of the exhaust gases from a turbojet engine is disclosed wherein the exhaust gases are vectored by an assembly that is separate from the flaps that are utilized to adjust the cross-sectional area of the exhaust nozzle. This results in a thrust vectoring exhaust nozzle that has reduced complexity, weight and bulk over the known prior art devices.

The thrust vectoring exhaust nozzle assembly according to the invention has a moveable thrust vectoring assembly comprised of inner and outer vectoring members, each of which have a generally annular configuration. The vectoring members are pivotally attached to the exhaust nozzle so as to pivot about an axis extending generally perpendicularly to the longitudinal axis of the exhaust duct.

The pivoting flaps for adjusting the cross-sectional area of the downstream end of the exhaust nozzle are located generally concentrically about the outer vectoring member. Only the vectoring members need to be pivoted about the pivot axis to vector the thrust. Thus, the nozzle flaps may be attached to the downstream end portion of the exhaust duct and may be controlled by known control systems.

The outer vectoring member is formed with a partially spherical outer section. When the nozzle flaps are contracted to reduce the cross-sectional area of the exhaust nozzle, their downstream edges may seal against this partially spherical portion of the outer vectoring member to prevent the passage of exhaust gases between the flaps and the outer vectoring member. The vectoring member may be pivoted about its axis to vector the thrust while the flaps are in their closed positions and they will continue to seal against the partially spherical wall portion.

DETAILED DESCRIPTION OF THE PREFERRED EMBODIMENT

Figure 1:
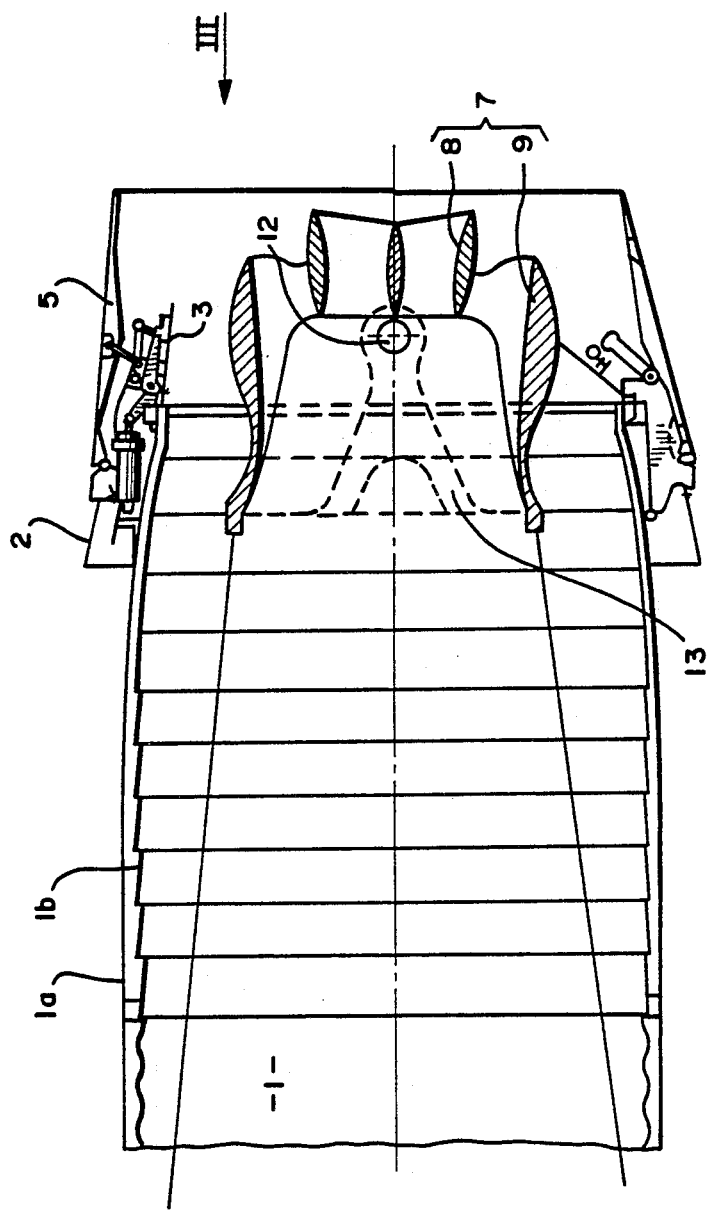
FIG. 1 is a partial, cross-sectional view taken along the longitudinal axis of the exhaust duct illustrating the thrust vectoring nozzle according to the invention with the nozzle flaps open in the upper half of the figure and with the nozzle flaps closed in the lower half of the figure.
Figure 3:
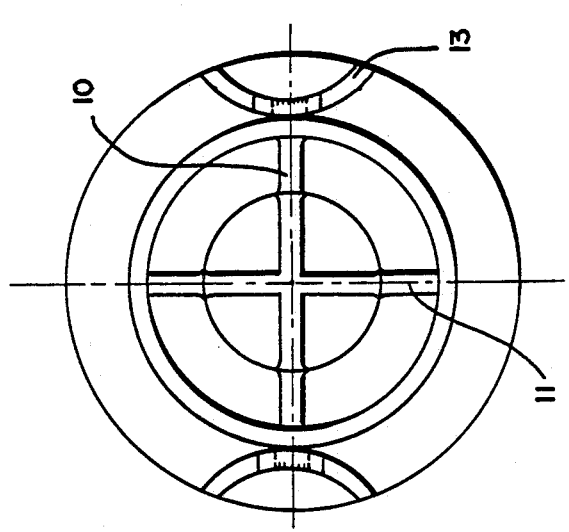
FIG. 3 is a partial, end view of the assembly shown in FIG. 1 viewed in the direction of arrow III.
Figure 2:
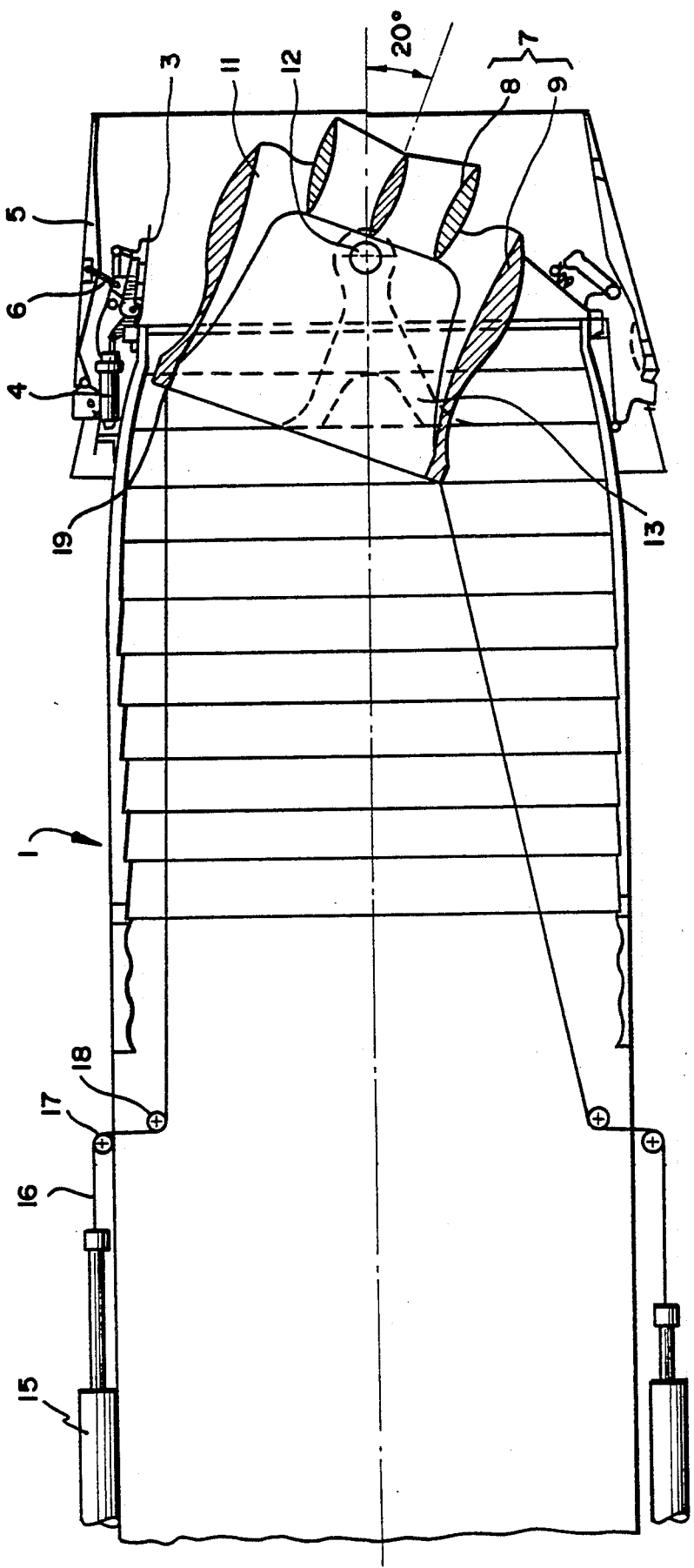
FIG. 2 is a partial, cross-sectional view similar to FIG. 1 illustrating the thrust vectoring nozzle according to the invention in a position to vector the thrust in a direction that is not parallel to the longitudinal axis of the exhaust duct.
Figure 4:
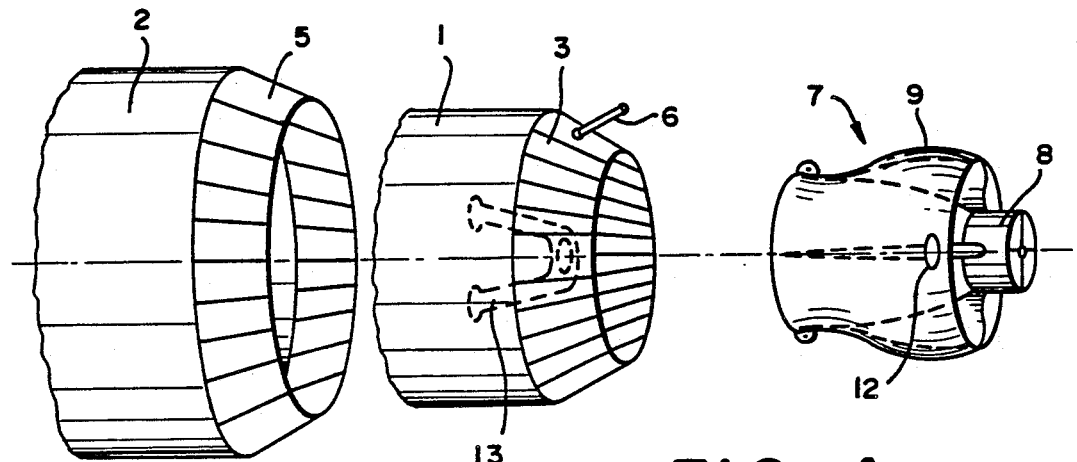
FIG. 4 is a partial, exploded view of the components of the nozzle according to the invention.

As best illustrated in FIGS. 1-3, the thrust vectoring exhaust nozzle assembly according to the present invention comprises an annular exhaust duct 1 extending from the downstream end of a turbojet engine (not shown). In known fashion, the exhaust duct 1 comprises an outer portion 1a and an inner portion 1b located generally concentrically with the outer part 1a. The space between the inner and outer duct portions provides heat protection from the aircraft structure surrounding the exhaust duct.

The direction of the exhaust gases is from left to right in FIG. 1 with the right portion of the exhaust duct being the "downstream" end. An external casing 2 which connects with the aircraft structure (not shown) when the system is mounted to the aircraft, is located concentrically about, and attached to a downstream end portion of the exhaust duct 1. In known fashion, an annular array of flaps 3 is pivotally attached to the downstream end of the exhaust duct 1. The flaps define downstream edges and may be pivoted about their upstream attachment so as to vary the cross-sectional area of the exhaust nozzle. In the upper portion of FIGS. 1 and 3, the flaps 3 are shown in their opened positions, while in the lower portion of these figures, the flaps 3 are shown in their retracted, closed positions. The operation and control of such flaps are well known in the art and, per se, form no part of the present invention.

Figure 6:
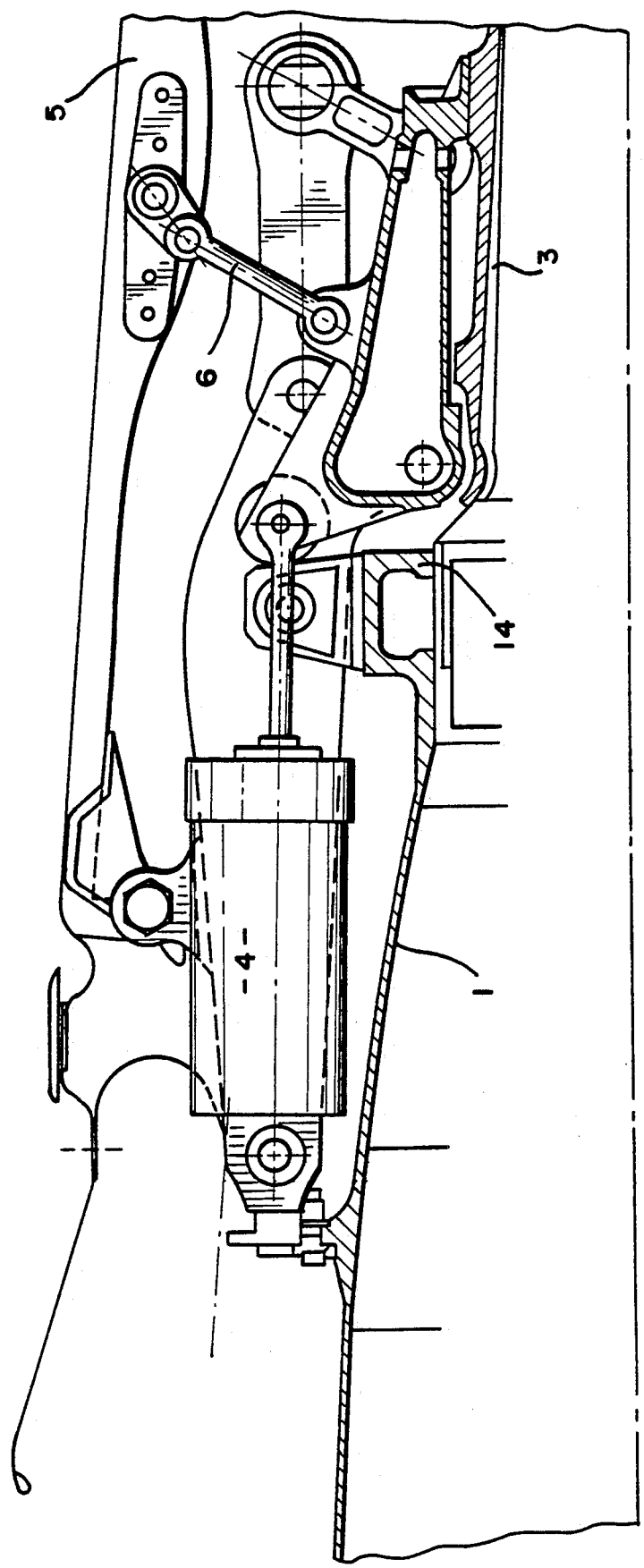
FIG. 6 is a partial, longitudinal cross-sectional view of the pivoting flap control assembly shown in FIG. 1.

As best illustrated in FIG. 6, the flaps 3 are actuated by one or more actuators 4 attached to the exhaust duct 1. The extensible and retractable actuating rod of the actuators is connected to the flap structure such that its extension and retraction will cause the flaps to pivot about their attachment to the exhaust duct.

A concentric, annular array of flaps 5, known in the art as "cold" flaps are pivotally attached at their upstream portions to the external casing 2. These flaps are operatively connected to the flaps 3 via link rods 6.

Thus, the actuator 4 controls both the movement of the flaps 3 and the flaps 5.

The thrust vectoring assembly located within the exhaust duct 1 comprises a central body, indicated generally at 7, which comprises two annular components of revolution, a first, inner vectoring member 8 and second, outer vectoring member 9. The inner vectoring member 8 has a generally annular shape about a thrust vectoring axis and may be strengthened or stiffened by generally radially extending, orthogonal arms 10 which extend across the opening of this member.

The outer vectoring member 9 is attached to and is generally concentric with the inner vectoring member by four generally radially extending arms 11.

Figure 5:
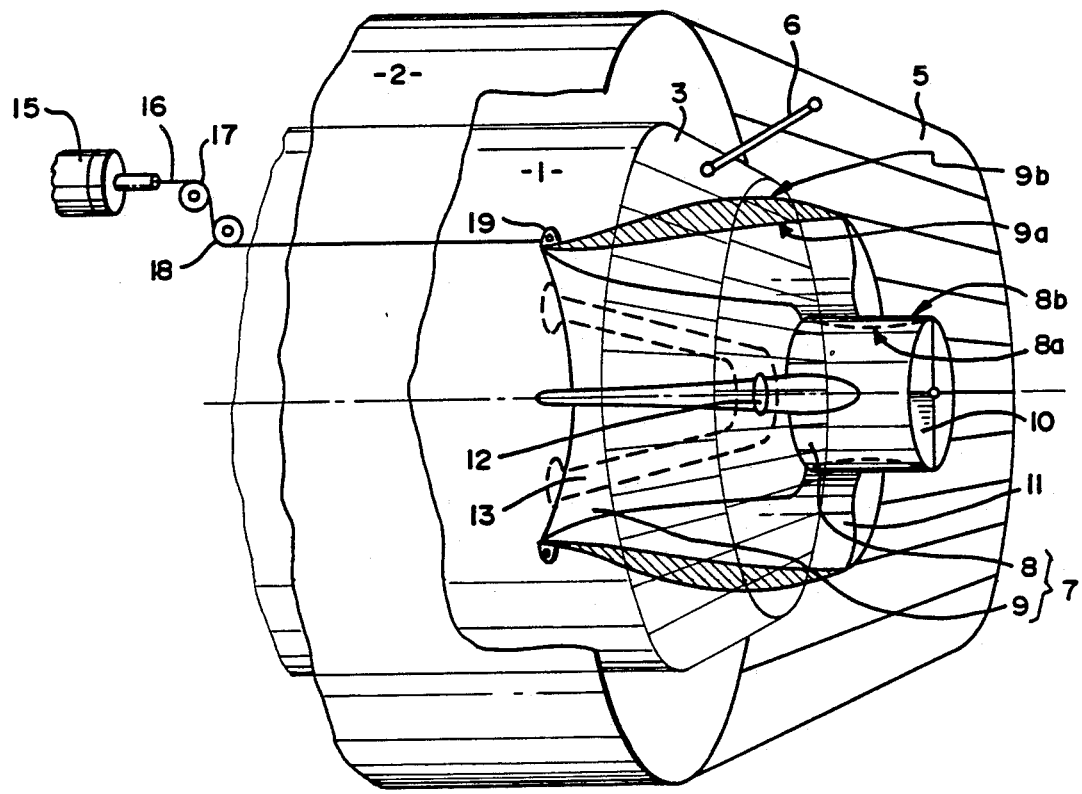
FIG. 5 is a partial, perspective view, partially broken away, of the thrust vectoring nozzle assembly according to the invention.

As illustrated best in FIG. 5, the respective inner walls 8a and 9a and the respective outer walls 8b and 9b of vectoring members 8 and 9 form converging-diverging nozzles in the upstream to downstream direction (from left to right as viewed in FIG. 5). The outer wall 9b of the outer vectoring member 9 defines a partially spherical portion.

The central body 7 is attached to the interior of the exhaust duct 1 such that at least a portion of the outer vectoring member extends into the interior of the exhaust duct. The attachment is achieved by brackets 13, having a generally horizontal "V" shape in which the apex of the "V" is pivotally attached to the outer vectoring member, while the legs of the "V" are fixedly attached to the exhaust duct 1 via the structural collar 14 (shown in FIG. 6). The pivoting attachment 12 between the bracket and the outer vectoring member 9 defines a pivot axis about which the central body 7 may pivot. The pivot axis extends generally perpendicular to the longitudinal axis of the engine and, as illustrated in the figures, these axes are located in a generally horizontally extending plane.

The control system for controlling the pivoting of the central body 7 about its pivot axis comprises a pair of actuators 15 fixed externally to the exhaust duct 1 and located upstream of the exhaust nozzle. Each of the actuators 15 has a extendible and retractable actuating rod and may be powered by known hydraulic or pneumatic control systems. Cable 16 has one end attached to one of the actuating rods and the opposite end attached to the outer vectoring member at attaching lug 19. The cable passes partially around pulley 17, located externally of the exhaust duct 1 and pulley 18, which may be located internally of the exhaust duct. The actuators 15 may be located diametrically opposite each other on the exhaust duct 1 and may lie in a plane that extends generally perpendicular to the pivot axis.

As is best seen in FIG. 2, the extension of one actuating rod and the retraction of the other will cause the central body 7 to pivot about its pivot axis so as to direct the exhaust gases passing through this central body at an angle to the longitudinal axis of the engine. In FIG. 2, this angle is indicated as being approximately 20°.

The exhaust nozzle according to the invention may assume a number of different configurations corresponding to different operating conditions of the power plant, the use of the aircraft and the missions involved. In FIG. 1, the central body 7 is oriented so as to direct the exhaust gases in a direction parallel to the longitudinal axis of the exhaust duct. In the upper half of FIG. 1, the flaps 3 of the exhaust duct are illustrated in their open positions to provide the maximum cross-sectional area for the exhaust duct. These positions generally correspond to the operation of the turbojet engine in which an afterburner is lit.

By changing the positions of flaps 3 via the control actuators 4, the cross-sectional area of the exhaust duct can be adjusted, as illustrated in the lower half of FIG. 1. In their closed positions, the flaps 3 achieve a minimum cross-sectional area of the exhaust duct, which would correspond to the full power operation of the turbojet engine with the afterburner off. In this configuration, the downstream edges of the flaps 3 bear against the spherical outer surface portion of the outer wall 9b of the outer vectoring member 9. A plane containing the lines of contact between the downstream edges of the flaps 3 and the outer vectoring member 9 passes through the pivot axis of the central body 7 which passes through the hinge means 12. This assures adequate sealing between the central body 7 and the flaps 3 even when the central body is pivoted about its pivot axis, as illustrated in FIG. 2.

As shown in the upper half of FIG. 2, full power operation with the afterburner lit may also be achieved by opening the flaps 3. In this instance, the central body 7 will deflect approximately 50% of the gases passing through the exhaust duct, the remaining portion passing between the central body 7 and the exhaust duct 1.

Thus, as can be seen, the thrust vectoring exhaust nozzle assembly according to the invention results in a nozzle having lower weight and bulk, and one that is more simple than the known prior art devices. The deflection of the exhaust gases improves the control of the associated aircraft while at the same time eliminating the drag on the aircraft that would be caused by using the normal aircraft control surfaces. The action of the exhaust gases on the central body 7 is such that, should a failure occur in the control system, the central body 7 will automatically be returned to the forward thrust position as illustrated in FIG. 1. Thus, the thrust vectoring nozzle will not endanger the control of the aircraft even if a malfunction should occur in its control system.

The foregoing is provided for illustrative purposes only and should not be construed as in any way limiting this invention, the scope of which is defined solely by the appended claims.

What is claimed is:

1. A thrust vectoring exhaust nozzle assembly for a turbojet engine with an exhaust duct generally concentric about a longitudinal axis and having at least one set of pivoting flaps arranged in a generally annular array about a downstream end of the duct to vary the cross-section of the nozzle, comprising:

(a) a first, inner vectoring member having a generally annular configuration about a thrust axis;
   (b) a second, outer vectoring member having a generally annular configuration;
   (c) support means connecting the inner and outer vectoring members together such that they are radially spaced apart and generally concentric about the thrust axis;
   (d) attaching means to pivotally attach the outer vectoring member to the exhaust duct adjacent its downstream end such that at least a portion of the outer vectoring member extends into the interior of the exhaust duct and such that the inner and outer vectoring members may pivot about a pivot axis extending generally perpendicular to the longitudinal axis; and, (e) control means operatively associated with one of the inner and outer vectoring members to pivot the vectoring members about the pivot axis such that exhaust gases passing through the vectoring members may be deflected at an angle to the longitudinal axis of the exhaust duct.

2. The thrust vectoring exhaust nozzle according to claim 1 wherein the pivot axis and the longitudinal axis lie in a generally horizontal plane.

3. The thrust vectoring exhaust nozzle according to claim 1 wherein the pivoting flaps define downstream edges and further comprising a partially spherical radially outer surface formed on the outer vectoring member located such that, when the downstream edges of the pivoting flaps are moved radially inwardly, they sealingly contact the partially spherical surface to prevent the passage of exhaust gases between the flaps and the outer vectoring member.

4. The thrust vectoring exhaust nozzle according to claim 3 wherein a plane including the lines of contact between the downstream edges and the outer vectoring member passes through the pivot axis.

5. The thrust vectoring exhaust nozzle according to claim 1 wherein the support means comprises four arms extending in a generally radial direction between the inner and outer vectoring members.

6. The thrust vectoring exhaust nozzle according to claim 5 further comprising stiffening members extending in generally orthogonal radial directions across the inner vectoring member.

7. The thrust vectoring exhaust nozzle according to claim 1 wherein the attaching means comprises a support bracket located on either side of the outer vectoring member having a first portion fixedly attached to the exhaust duct and a second portion pivotally attached to the outer vectoring member.

8. The thrust vectoring exhaust nozzle according to claim 7 wherein each support bracket has a generally "V" shape with the apex of the "V" pivotally attached to the outer vectoring member.

9. The thrust vectoring exhaust nozzle according to claim 1 wherein the control system comprises:
 (a) a pair of control actuators each having an extensible and retractable actuating rod; and,
 (b) connecting means connecting the actuating rods to the outer vectoring member on opposite sides of the pivot axis such that extension of one actuating rod and retraction of the other actuating rod causes the vectoring members to pivot about the pivot axis.

10. The thrust vectoring exhaust nozzle according to claim 9 wherein each connecting means comprises:
 (a) a cable having a first end attached to an actuating rod and a second end attached to the outer vectoring member;
 (b) a first pulley located externally of the exhaust duct; and,
 (c) a second pulley located in the exhaust duct such that the cable passes at least partially around the first and second pulleys.

* * * * *